US010934801B2

(12) United States Patent
Beard et al.

(10) Patent No.: US 10,934,801 B2
(45) Date of Patent: Mar. 2, 2021

(54) LOCKOUT FOR HYDRAULIC ROTARY VALVE IN CONTROL SYSTEM FOR OIL WELL BLOW-OUT PREVENTER

(71) Applicant: PacSeal Group, Inc., Brea, CA (US)

(72) Inventors: Joseph O. Beard, Fullerton, CA (US); Frode Sveen, Chino, CA (US); Douglas W. Beard, Brea, CA (US)

(73) Assignee: PacSeal Group, Inc., Brea, CA (US)

( * ) Notice: Subject to any disclaimer, the term of this patent is extended or adjusted under 35 U.S.C. 154(b) by 0 days.

(21) Appl. No.: 16/434,894

(22) Filed: Jun. 7, 2019

(65) Prior Publication Data
US 2020/0386068 A1  Dec. 10, 2020

(51) Int. Cl.
E21B 33/06 (2006.01)
E21B 34/02 (2006.01)
E21B 21/08 (2006.01)
F16K 31/60 (2006.01)

(52) U.S. Cl.
CPC .............. E21B 33/06 (2013.01); E21B 21/08 (2013.01); E21B 34/02 (2013.01); F16K 31/60 (2013.01)

(58) Field of Classification Search
CPC .......... E21B 33/06; E21B 34/02; E21B 21/08; F16K 31/60; F16K 31/602; F16K 3/08; F16K 3/06; F16K 3/24
USPC .............. 251/99, 98, 90, 110, 297, 208, 209
See application file for complete search history.

(56) References Cited

U.S. PATENT DOCUMENTS

| | | | | |
|---|---|---|---|---|
| 2,696,219 A | * | 12/1954 | Barksdale | F16K 11/0743 137/625.43 |
| 3,134,405 A | * | 5/1964 | White | F16K 5/10 137/625.32 |
| 3,949,966 A | * | 4/1976 | Fabish | A61M 16/20 251/206 |
| 4,059,657 A | * | 11/1977 | Hay | A61M 16/18 261/104 |
| 4,148,460 A | * | 4/1979 | Kinsler | F16K 3/32 251/185 |
| 4,274,445 A | * | 6/1981 | Cooper | F16K 11/163 137/636.1 |
| 4,858,882 A | | 8/1989 | Beard et al. | |
| 4,930,745 A | | 6/1990 | Granger et al. | |
| 4,949,785 A | | 8/1990 | Beard et al. | |
| 5,044,603 A | | 9/1991 | Granger et al. | |
| 5,056,418 A | | 10/1991 | Granger et al. | |
| 5,116,017 A | | 5/1992 | Granger et al. | |
| 5,123,449 A | * | 6/1992 | Nowicki | F16K 11/085 137/625.11 |
| 5,285,997 A | * | 2/1994 | Chang | F16K 35/025 251/102 |
| 5,647,389 A | * | 7/1997 | Holloway | F16K 31/602 137/15.18 |
| 5,944,051 A | * | 8/1999 | Johnson | A62C 37/50 137/559 |
| 7,404,543 B2 | * | 7/2008 | Weston | F16K 47/023 251/286 |
| 7,503,344 B2 | * | 3/2009 | Pili | F15B 13/0406 137/625.21 |
| 9,587,454 B1 | | 3/2017 | Beard et al. | |

(Continued)

Primary Examiner — Umashankar Venkatesan
Assistant Examiner — Andrew J Rost
(74) Attorney, Agent, or Firm — Knobbe, Martens, Olson & Bear, LLP

(57) ABSTRACT

A locking handle assembly for a rotary valve used in a hydraulic control system for a blow-out preventer used in oil and gas wells.

18 Claims, 12 Drawing Sheets

(56) References Cited

U.S. PATENT DOCUMENTS 9,879,504 B1     1/2018   Beard et al.
10,234,055 B2    3/2019   Bertrem et al.

\* cited by examiner

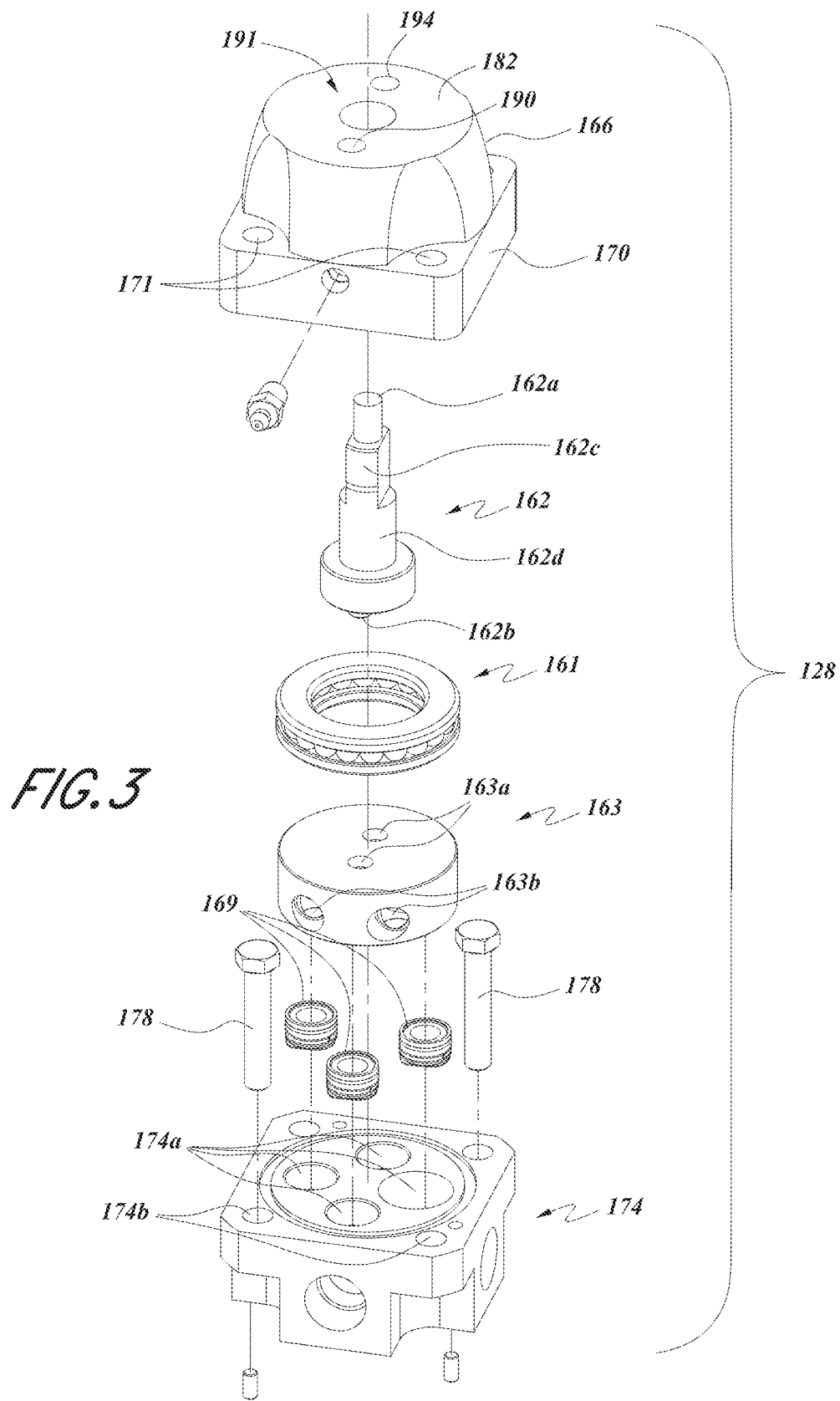

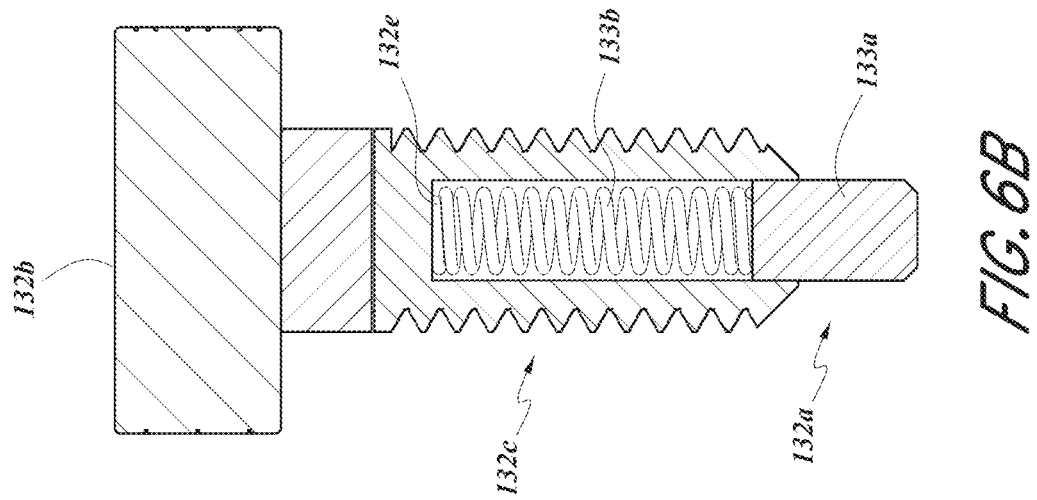
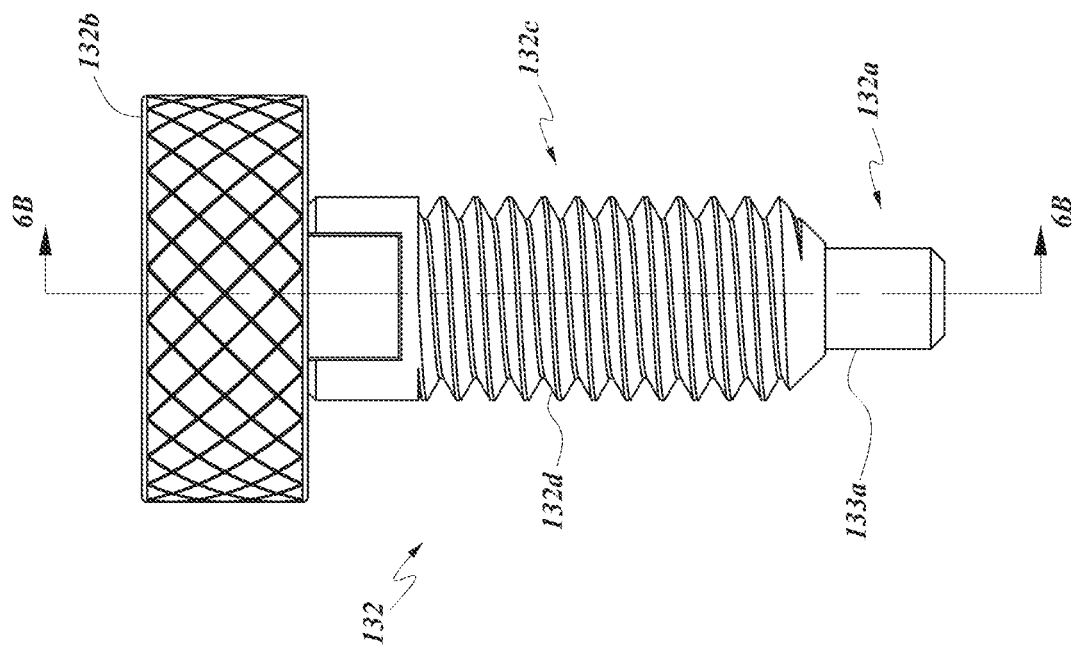

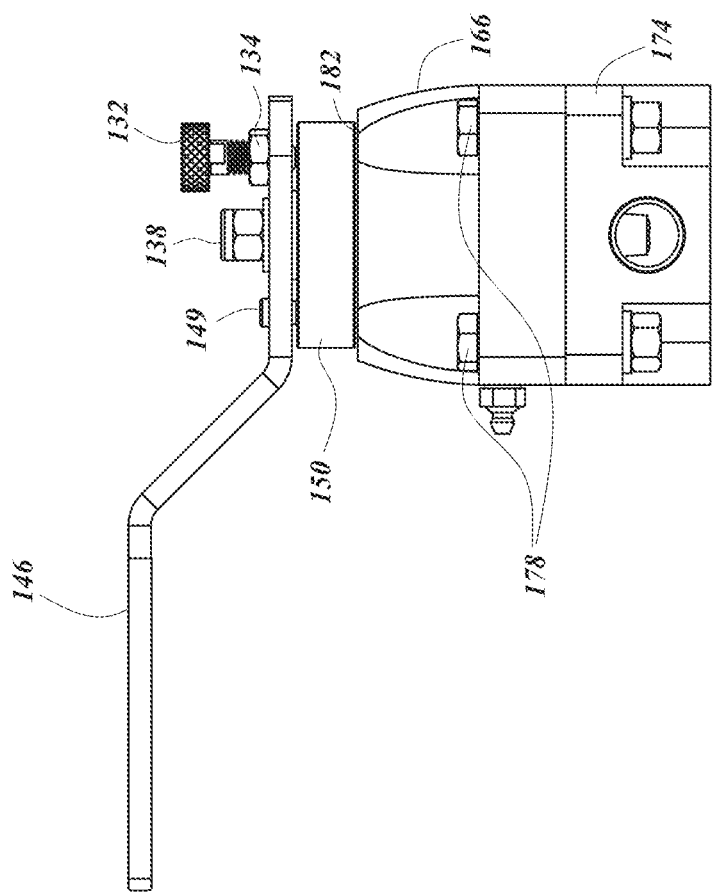
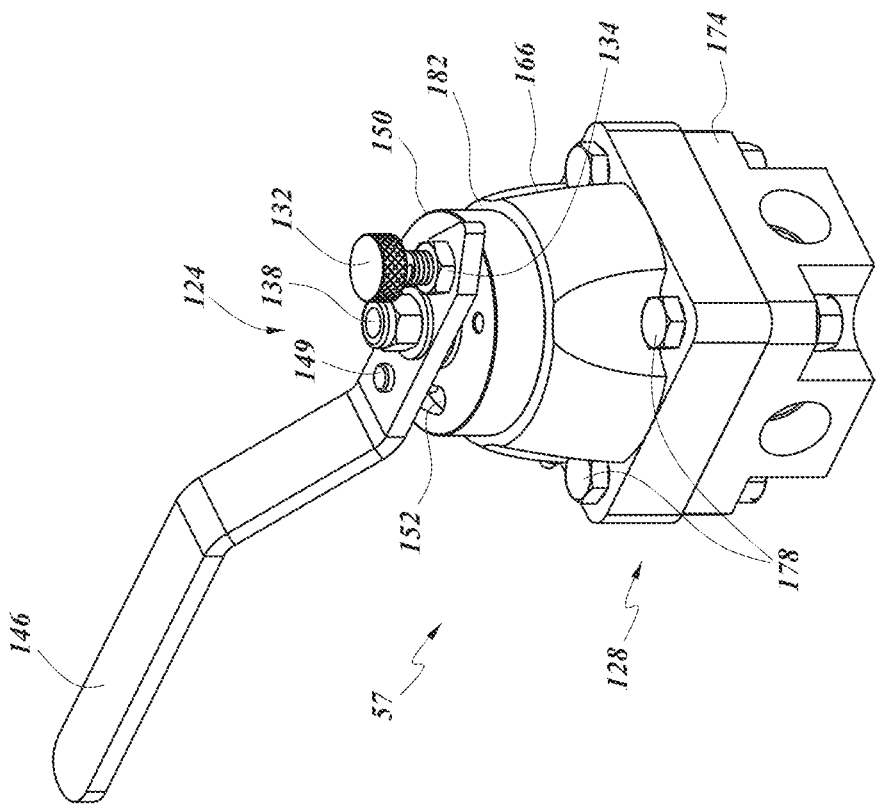
FIG. 7B
FIG. 7A

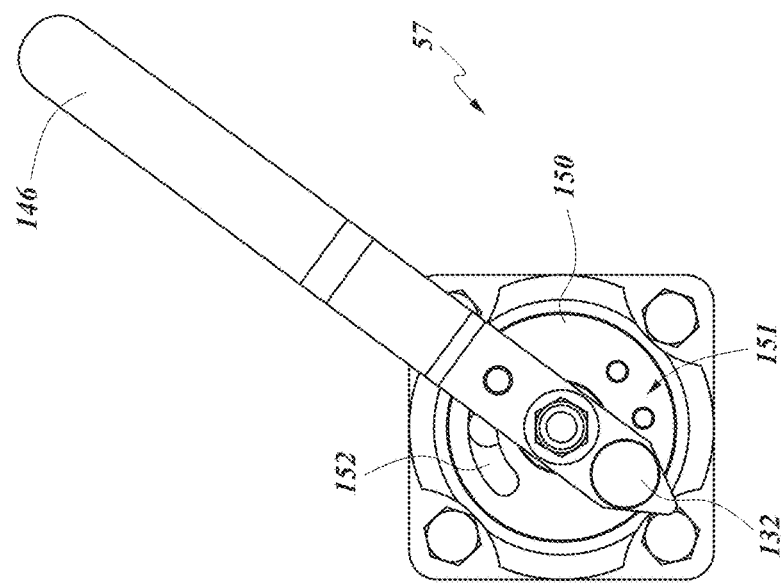
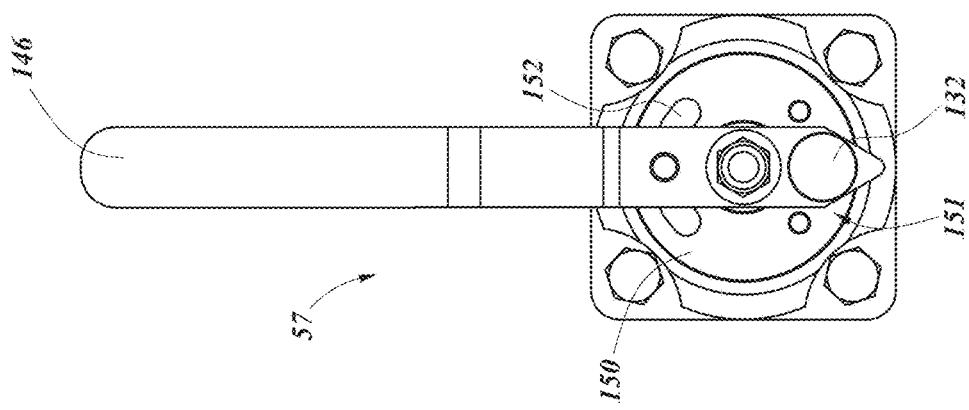
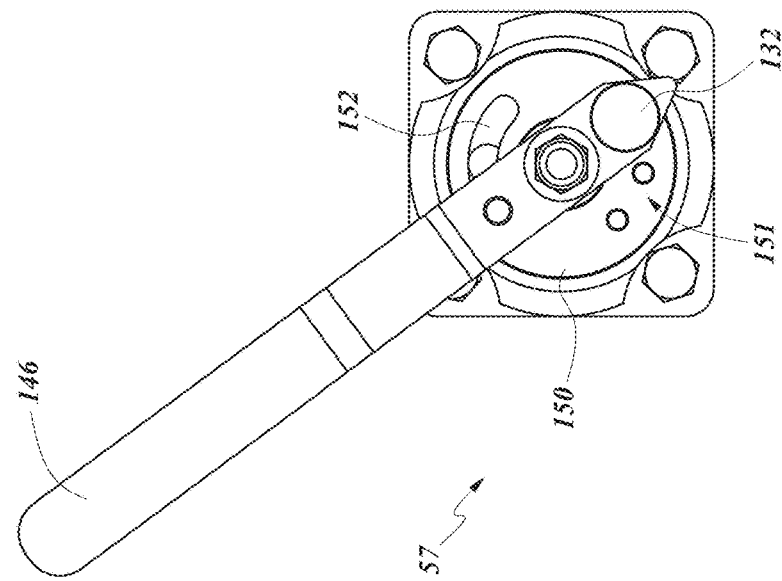

LOCKOUT FOR HYDRAULIC ROTARY VALVE IN CONTROL SYSTEM FOR OIL WELL BLOW-OUT PREVENTER

BACKGROUND

Field

This invention generally relates to hydraulic control systems for blow-out preventers used in oil and gas well drilling operations.

Related Art

An oil or gas well can be drill using a drill string. The drill string can include many lengths of threaded pipes that are screwed together and tipped with a drill bit head. The drill bit head is used to bore through solid rock and soil. The drill bit head has a larger diameter than the pipes forming the drill string. A rotary engine coupled to the upper end of the drill string transmits a rotary boring action to the drill bit head through the drill string During drilling operations, a specially formulated mud is introduced into an opening in the drill string. This mud, which is selected to have a high specific gravity, flows downward through the interior of the pipes in the drill string and out through small holes or jets near the drill bit head. Since the drill bit head has a larger diameter than the drill string above it, an elongated annular space is created between the drill string and the interior walls of the borehole. This annular space permits the mud to flow upwards to the surface. Mud flowing upwards carries drill cuttings (e.g., rock chips) to the surface. The mud also lubricates the rotating drilling string and provides a downward hydrostatic pressure which counteracts pressure that may be encountered in subsurface gas pockets. A well casing can also be located within the borehole between the drill string and the interior walls of the borehole.

It is not uncommon to encounter subsurface gas pockets in a drilling operation. The pressure in some of these subsurface gas pockets can be greater than the hydrostatic pressure of the column of drill mud contained in the annular of space of the borehole. To prevent an explosive and potentially dangerous release of gas or liquid out of the drilling hole a blow-out preventer (BOP) used. BOPs are usually mounted to a drill pipe or well casing near the upper end of the borehole. The BOP can be mounted to drill string components such as a drill pipe or well casing tubes. The BOP functions by shutting off all upper movement of a gas, liquid, or drill string components which could be forced upwardly in response to pressure encountered in an oil or gas reservoir.

A typical BOP includes a vertical stack of various types of BOPs. The stack usually includes an annular type of BOP which can be located at the top end of the stack near the well head. Annular BOPs have a resilient sealing means or cushion which can be forced by hydraulic cylinders into compressive sealing contact with the outer circumferential surface of various diameter drill string components or well casings. This can prevent pressure from the subterranean or subsurface gas pockets from blowing out material along the drill string and up the borehole. Usually the resilient sealing cushion is designed to permit abutting contact of a plurality of sealing elements even when all elements of a drill string are removed from the casing. This permits the complete shut off of the well even when all drill string elements are completely removed. Most BOPs are also remotely operable and can be controlled by hydraulic control systems.

Most BOPs also include a series of different types of BOPs in the vertical stack below the annular BOP. Types of BOPs include pipe rams, blind rams, and/or shear rams.

An existing rotary valve assembly (e.g., as shown in U.S. Pat. No. 10,234,055 (Bertrem et al.)) can include a handle attached with a stem for adjusting the position of an internal rotor and pathways through the rotary valve assembly. The position of the handle, and the stem, and the rotor can be held temporarily in place by means of a ball detent mechanism. The ball detent mechanism can include a ball bearing that is mounted with a spring. The spring can press the ball bearing within an aperture of the handle or a rotatable plate attached with the handle to position the rotary valve assembly in one or more discreet positions.

SUMMARY

One aspect of the present disclosure is the recognition that the existing ball spring mechanisms to position the rotary valve can be unreliable. The ball spring mechanisms fail to securely lock the position of the handle in the conventional rotary valve assembly. A sufficient force can misalign the rotary valve from the desired positioning. However, it can also be expensive to entirely replace a rotary valve assembly.

Another aspect of the present disclosure is a control system for a BOP. The BOP can include a hydraulic pump. The hydraulic pump can be linked with a motor for powering the hydraulic pump. The control system can include a plurality of pressure accumulator tanks. The pressure accumulator tanks can be hydraulically coupled together through a common manifold. The common manifold can provide a flow of pressurized hydraulic fluid to a plurality of opening and closing actuators of a BOP located on an oil or gas well drill string. A plurality of conduits can hydraulically couple the hydraulic pump with the plurality of pressure accumulators. The plurality of conduits can also include one or more pressure regulators.

The control system can include a rotary valve assembly for selectively delivering (e.g. either manually or remotely) a flow of pressurized hydraulic fluid to actuators of the BOP. The rotary valve can have an internal rotor defining a plurality of pathways. The internal rotor can be rotated to select between the plurality of pathways. A stem can attach with the internal rotor. The stem can have a flanged end protruding from a housing of the rotary assembly.

The rotary valve can include a locking handle assembly. The locking handle assembly can include a detent plate. The detent plate can have an inner periphery disposed over or around the stem. The detent plate can be non-rotatable assembled or attached with an outer surface of the housing of the rotary valve assembly. The detent plate can include a plurality of detent apertures and a guide slot. A handle of the handle assembly can have an inner end and an outer end. The inner end can include a spring pin, a guide protuberance, and an engagement slot between the spring pin and the guide protuberance. An engagement slot can be sized to fit over the flange portion of the stem. An end of the spring pin can extend a least partially through the inner end. The guide protuberance can be disposed within the guide slot. The BOP can be mounted on a transportable skid.

In the first position of the rotary valve assembly, the handle is rotated to align the spring pin with a first detent aperture of the plurality of detent apertures; the internal rotor is aligned along a first flow path to deliver the flow of pressurized hydraulic fluid to the opening actuator of the BOP. The end of the spring pin is disposed within the first detent aperture to lock the rotary valve assembly in the first position.

In a second position of the rotary valve assembly, a handle is rotated to align the spring pin with a second detent aperture of the plurality of detent apertures; the internal rotor is aligned along a second flow path to deliver the flow of pressurized hydraulic fluid to a closing actuator of the BOP. The end of the spring pin is disposed within the second detent aperture to lock the rotary valve assembly in the second position.

In a third position of the rotary valve assembly, a handle is rotated to align the spring pin with a third detent aperture of the plurality of detent apertures; the internal rotor is aligned along to close the flow of pressurized hydraulic fluid to the BOP. The end of the spring pin is disposed within the third detent aperture to lock the rotary valve assembly in the third position.

According to one aspect of the present disclosure a rotary valve assembly includes a locking handle assembly for locking positions of the rotary valve assembly. Improper positioning of a handle of the rotary valve assembly (e.g., either intentional or unintentionally) can result in malfunction of the control system and the BOP. This can have serious and dangerous consequences. Accordingly, it is desirable to securely lock the rotary valve assembly in one or more desired operating positions. A properly constructed locking handle assembly can prevent intentional tampering and/or unauthorized or inadvertent manipulation of the rotary valve assembly from the desired operating position.

According to another aspect of the present disclosure a control system for a BOP includes a rotary valve assembly and a handle assembly. The rotary valve assembly is used for selectively delivering a flow of pressurized hydraulic fluid to a BOP. The rotary valve assembly can have an internal rotor defining a plurality of fluid pathways. The internal rotor's position can be manipulated via a stem engaged with the internal rotor a flanged end of the stem protruding from a housing of the rotary valve assembly. The handle assembly can include a detent plate assembled with an outer surface of the housing of the rotary valve assembly. The detent plate can include a plurality of detent apertures. A handle having an inner end and an outer end can be coupled with the flanged end of the stem. The inner end of the handle can include a pin and an engagement slot. The engagement slot can fit over the flanged end of the pin. An end of the pin can extend at least partially through the inner end of the handle.

In a first position of the rotary valve assembly the handle can be rotated to align a pin with a first detent aperture of the plurality of detent apertures and the internal rotor can be aligned along a first flow path to deliver the flow of pressurized hydraulic fluid to the opening actuator of the BOP. The end of the pin can be disposed within the first detent aperture to lock the rotary valve assembly in the first position. In the second position of the rotary valve assembly the handle can be rotated to align the pin with a second detent apertures of the plurality of detent apertures. The internal rotor can be aligned along a second flow path to deliver the flow of pressurized hydraulic fluid to the closing actuator of the BOP. The end of the pin can be disposed within the second detent aperture to lock the rotary valve assembly in the second position. In a third position of the rotary valve assembly, the handle can be rotated to align the pin with a third detent aperture of the plurality of detent apertures. The internal rotor can be aligned to close all flow paths for the flow of pressurized hydraulic fluid. The end of the pin can be disposed within the third detent aperture to lock the rotary valve assembly in the third position.

According to another aspect of the present disclosure a locking handle assembly kit can be used for converting an existing rotary vale assembly. The locking handle assembly kit can be used to convert the conventional rotary valve assembly. The locking handle assembly kit can include a detent plate. The detent plate can attach with a flat surface on a housing of the rotary valve assembly. The detent plate can attach in a non-rotatable manner with the housing of the rotary valve assembly. One or more alignment pins can be used to fix the alignment of the detent plate with the housing of the rotary valve assembly. The detent plate can include an inner periphery disposed over a stem of the rotary valve assembly. An upper surface of the detent plate can include a plurality of detent apertures. The upper surface of the detent plate can include a guide slot. The guide slot can be an arc or circumferential slot.

The locking handle assembly kit can include a handle. The handle can have an inner end and an outer end. The inner end can attach with the stem of a rotary valve assembly. The inner end can include a guide protuberance and an engagement slot. The engagement slot can couple the handle with a flange portion of the stem. The guide protuberance is configured to be disposed within the guide slot. A spring pin can be assembled with the inner end of the handle. An end of the spring pin can extend from the inner end of the handle. The end of the spring pin can extend towards the plurality of detent apertures. The spring pain can lock the locking handle in a first position by being inserted within a first detent aperture of the plurality of detent apertures. The spring pin can be configured to lock the locking handle assembly in a second position with the end of the spring pin aligned within a second detent aperture of the plurality of detent apertures. The spring pin can be threadingly engaged on the inner end of the handle. The locking handle assembly kit can lock the rotary valve assembly in first, second, and/or third positions corresponding to delivery of a flow of pressurized fluid to an opening actuator of a BOP, delivery of a flow of pressurized fluid to a closing actuator of the BOP, and closing of fluid flow to the BOP, respectively.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein.

BRIEF DESCRIPTION OF THE DRAWINGS

Various examples are depicted in the accompanying drawings for illustrative purposes, and should in no way be interpreted as limiting the scope of the examples. Various features of different disclosed examples can be combined to form additional examples, which are part of this disclosure.

FIG. 3 is an exploded view of the rotary valve assembly of FIG. 2.

FIG. 6A is a front view of a spring pin of the locking assembly of FIG. 2.

FIG. 6B is a section view taken along the line B-B in FIG. 6A.

FIG. 7A is a top perspective view of an assembled rotary valve assembly having the locking handle assembly of FIG. 2.

FIG. 7B is a side view of the rotary valve assembly of FIG. 7A.

FIG. 10A shows the rotary valve assembly of FIG. 7A in a first position.

FIG. 10B shows the rotary valve assembly of FIG. 10A in a second position.

FIG. 10C shows the rotary valve assembly of FIG. 10A in a third position.

DETAILED DESCRIPTION

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

Figure 1:
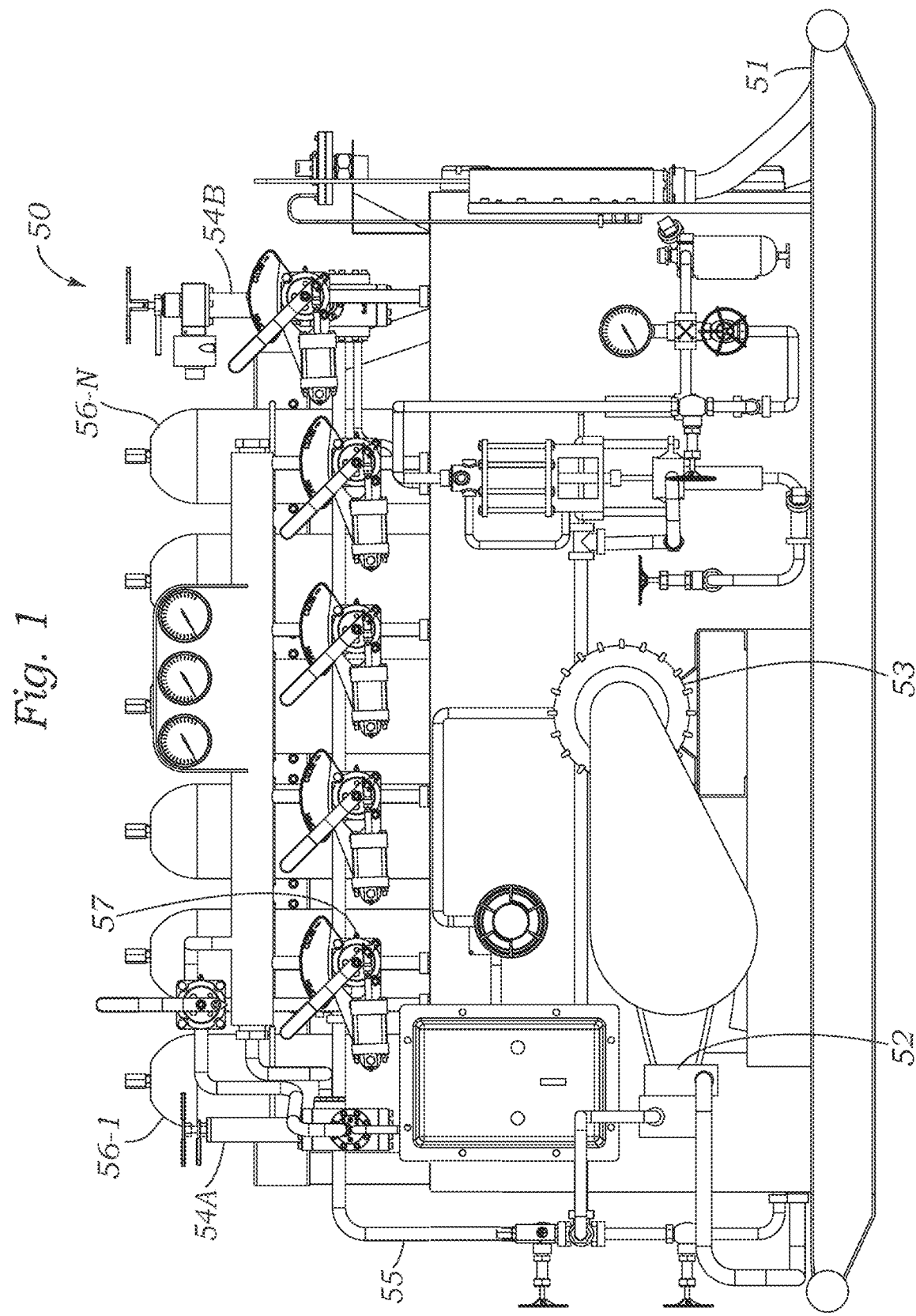
FIG. 1 is a front elevation view of a hydraulic control system for a BOP showing a plurality of hydraulic control valves.

FIG. 1 shows a control system 50 for a blow-out preventer (BOP). The control system 50 can include various mechanical components that are mounted on a skid 51. The skid 51 can be transportable to a location near an oil or gas well head. The control system 50 can include a hydraulic pump 52. The hydraulic pump 52 can be driven by an electric, pneumatic, or hydraulic motor 53. The motor 53 can power the hydraulic pump 52 to provide a pressurized hydraulic fluid to a plurality of hydraulic pressure accumulators 56. FIG. 1 shows hydraulic accumulators 56-1 through 56-n. In some implementations. The control system 50 can include a single hydraulic pressure accumulator 56. The hydraulic pump 52 can deliver the pressurized hydraulic fluid to the hydraulic pressure accumulators 56 through various pressure regulators 54A, 54B, and conduits 55. The control system 50 can include a common manifold for the plurality of hydraulic pressure accumulators 56. However the common manifold is not required. The hydraulic pressure accumulators 56 provide pressurized hydraulic fluid for opening and closing hydraulic actuators on a multiplicity of separate BOP devices mounted to an oil well drill string.

As shown further in FIG. 1 the BOP control system 50 can include a plurality of control valves 57. The control valves 57 can be operated manually and/or remotely. For manual operation the control valves 57 can each include a handle for selecting a fluid pathway or closing the control valve 57. Similarly, the handle can be mounted to an actuator (e.g. electric, hydraulic, or otherwise controlled) for actuating the control valves 57. The control valves 57 can include a three position type valve. The control valves 57 can be rotary control valves.

Figure 2:
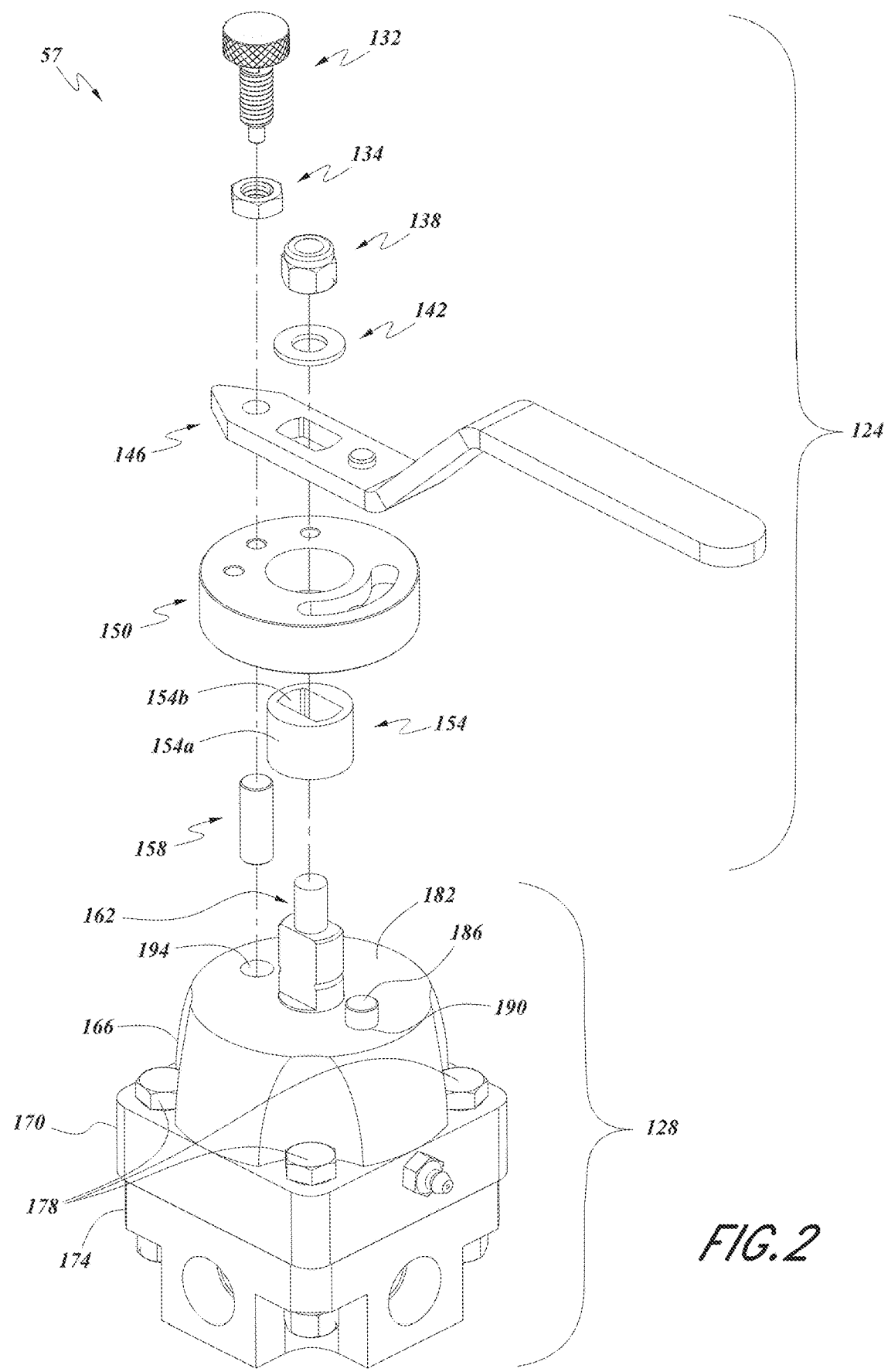
FIG. 2 is an exploded view of a rotary valve assembly having a locking handle assembly.

FIG. 2 shows an example of a control valve 57. The control valve 57 can include a valve assembly 128. The valve assembly 128 can include an upper casing 166. The valve assembly 128 can include a lower casing 174. The upper casing 166 can be coupled with the lower casing 174. A plurality of mechanical fasteners 178 (e.g. nuts and bolts, rivets, screws, or other types of mechanical fasteners) can couple together the upper casing 166 with the lower casing 174. The upper casing 166 can include an upper flat region 182. The upper flat region 182 can include one or more alignment apertures 190, 194. In one implementation the alignment apertures 190, 194 are aligned on opposite sides of the flat region 182. The upper casing 166 can include a central aperture 191. The upper casing 166 can include a lower flange 170. The lower flange 170 can include a plurality of apertures 171 (FIG. 3) for receiving the mechanical fasteners 178.

Referring to FIG. 3, the valve assembly 128 can include a stem 162. The stem 162 can include a first end 162a and a second end 162b. The first end 162a can include a threaded shaft. The second end 162b can include one or more interface projections. The interface projections of 162b can be cylindrically shaped pins extending from the second end 162b. The stem 162 can include a flanged portion 162c. The flanged portion 162c can be adjacent to the first end 162a. The flanged portion 162c can have two flat parallel sides on opposite sides of the stem 162. The stem 162 can include a cylindrical portion 162d. The cylindrical portion 162d can have a circular cross section. The cylindrical portion 162d can be between the flange portion 162c and the second end 162b. In one implementation the second end 162b can have a cross sectional diameter larger than the cylindrical portion of 162d. The stem 162 can align with the central aperture 191 and/or be partially received therein. The flange portion 162c and the first end 162a can protrude through the upper housing 166 through the central aperture 191. The second end 162b can be maintained within the upper housing 166 by the wider diameter of the second end 162b. The stem 162 can be rotatable relative to the upper housing 166.

The valve assembly 128 can include a bearing 161. The bearing 161 can be located between the upper housing 166 and a rotor 163. The rotor 163 can rotate relative to the upper housing 166. The rotor 163 can include one or more interface apertures 163a. The interface apertures 163a can correspond to the interface projections of the second end 162b on the stem 162. In other implementations, the rotor 163 can include projections and the stem 162 can include corresponding interface apertures or a combination thereof. The second end 162b can interface with the rotor 163 through the interface apertures 163a. The interface projections can couple rotation of the rotor 163 with rotation of the stem 162.

The rotor 163 can include a plurality of fluid pathways 163b extending therethrough that are selected/aligned by rotation of the rotor 163. The lower housing 174 can include a plurality of fluid pathways 174a. The plurality of fluid pathways 174a can correspond to the fluid pathways 163b of the rotor 163. In this manner the rotor 163 can be rotated to align any of the various fluid pathways 163b with the fluid pathways 174a to allow pressurized hydraulic fluid to flow through the valve assembly 128. The valve assembly 128 can include a plurality of seals 169. The seals 169 can form a metal-to-metal seal with the rotor 163 and/or the lower housing 174 to seal against the escape of the pressurized fluid from the valve assembly 128. The lower housing 174 can include a plurality of apertures 174b for assembly with the upper housing 166 via the plurality of mechanical fasteners 178.

The alignment opening 190 can include an alignment pin 186. The alignment pin 186 can be received on one end within the alignment aperture 190 and protrude therefrom. In some implementations the flat surface 192 can include other alignment pins and/or apertures.

Figure 4A:
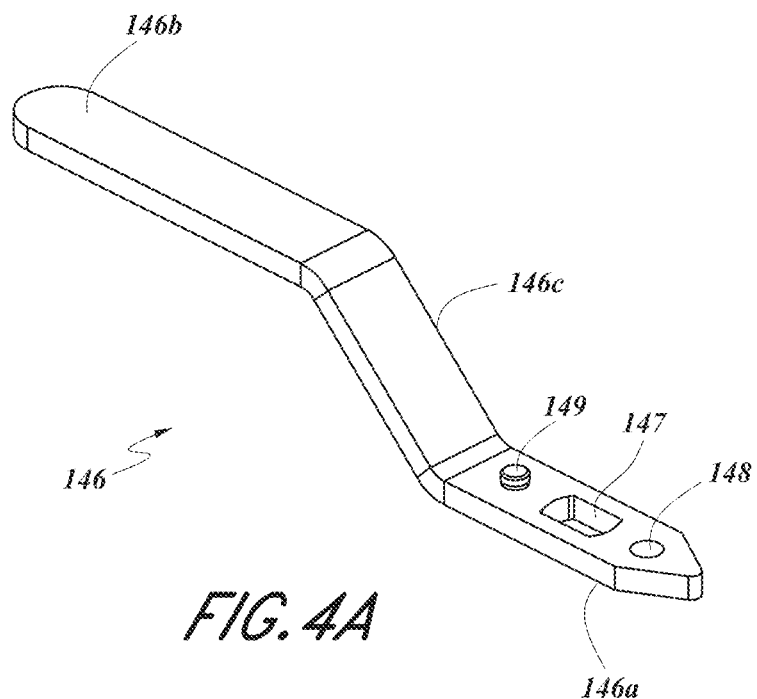
FIG. 4A is a perspective view of a handle of the locking handle assembly of FIG. 2.
Figure 4B:
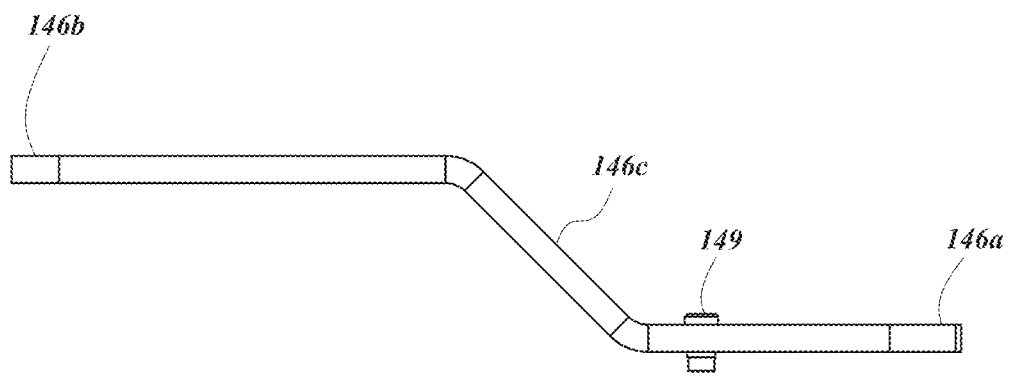
FIG. 4B is a side view of the handle of FIG. 4A.

The rotary valve 57 can include a locking handle assembly 124. The locking handle assembly 124 can include a handle 146. The handle 146 is shown further in FIGS. 4A and 4B. The handle 146 can include an inner end 146a and an outer end 146b. The outer end 146b can be sized to be easily grasped by a user. For example, the length of the outer end 146 can be sized to provide sufficient leverage to make it easy to actuate the rotary valve 57 (e.g., manually or using an actuator). In some embodiments, the handle is at least 4 inches long, at least 5 inches long or at least 6 inches long. The outer end 146b can include a rubber covering or other protective element. The outer end 146b can be connected with the inner end 146a by an angled portion 146c that offsets the outer end 146b a distance (e.g., vertically) from the inner end 146a. The inner end 146a can include an engagement slot 147. The engagement slot 147 can be sized to correspond and fit over the first end 162a and the stem 162. The engagement slot 147 can correspond to the flange portion 162c of the stem 162. The handle 146 can be used to rotate the stem 162 by engagement through the flange portion 162c.

The inner end 146a can include a guide protuberance 149. The guide protuberance 149 can be coupled with the inner end 146. The guide protuberance 149 can be removable or permanently coupled (e.g. by press fit) with the inner end 146a. The guide protuberance 149 can extend outwardly from the inner end 146a.

The inner end 146a can include an aperture, such as pin aperture 148. The pin aperture 148 can be sized to receive a spring pin 132, as described further below. In one implementation the pin aperture 148 includes a plurality or at least one internal thread for engagement with the spring pin 132. In other implementations the pin aperture 148 is used in conjunction with a nut 134. The nut 134 can be attached (e.g. welded) with the inner end 146a for receiving the spring pin 132. In one implementation the engagement slot 147 can be located between the guide protuberance 149 and the pin aperture 148. For example, the pin aperture 148 can be located on the outermost end of the inner end 146a and the guide protuberance 149 can be located on the innermost end of the inner end 146a, although this is not required.

Figure 5A:
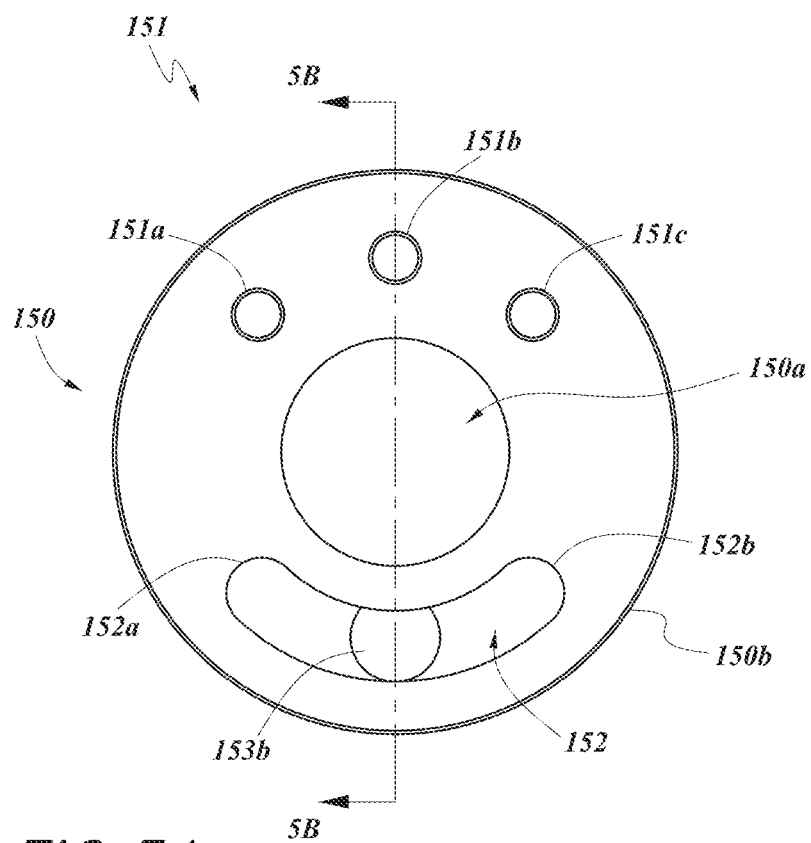
FIG. 5A is a top view of a detent plate of the locking handle assembly of FIG. 2.
Figure 5B:
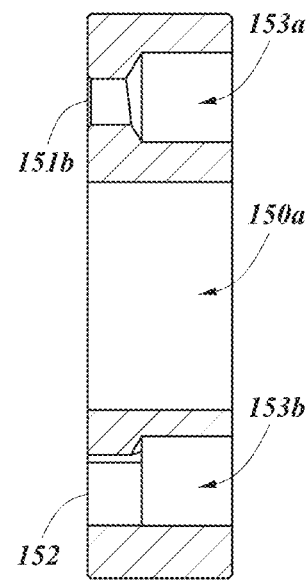
FIG. 5B is a section view taken along the line A-A in FIG. 5A.
Figure 5C:
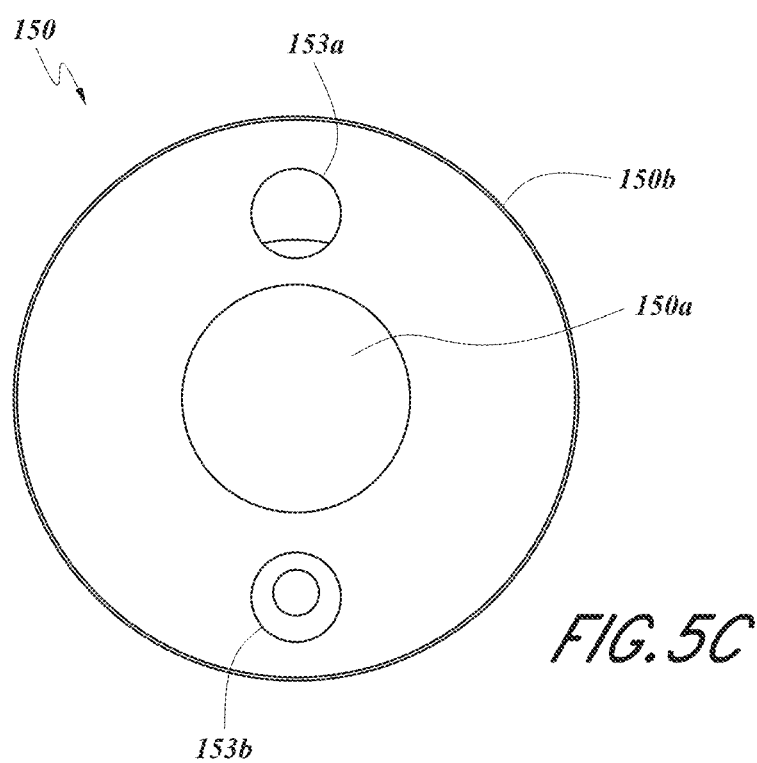
FIG. 5C is a bottom view of the detent plate of FIG. 5A.
Figure 8B:
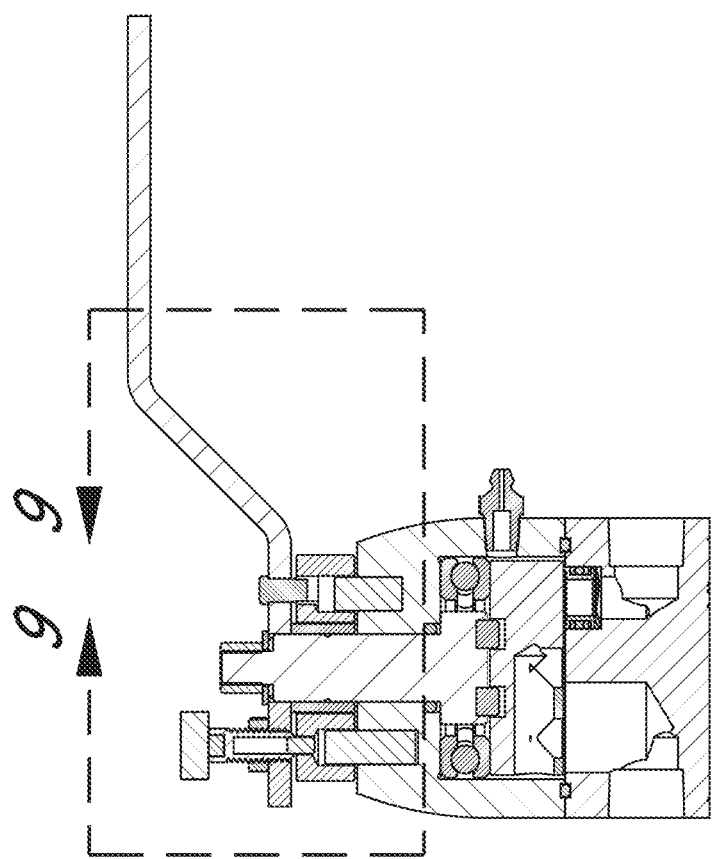
FIG. 8B is a section view taken along the line C-C in FIG. 8A.
Figure 8A:
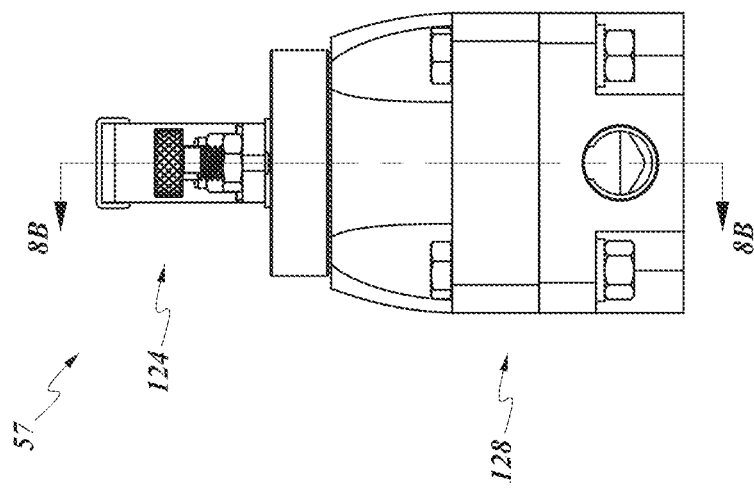
FIG. 8A is a front view of the rotary valve assembly of FIG. 7A.
Figure 9:
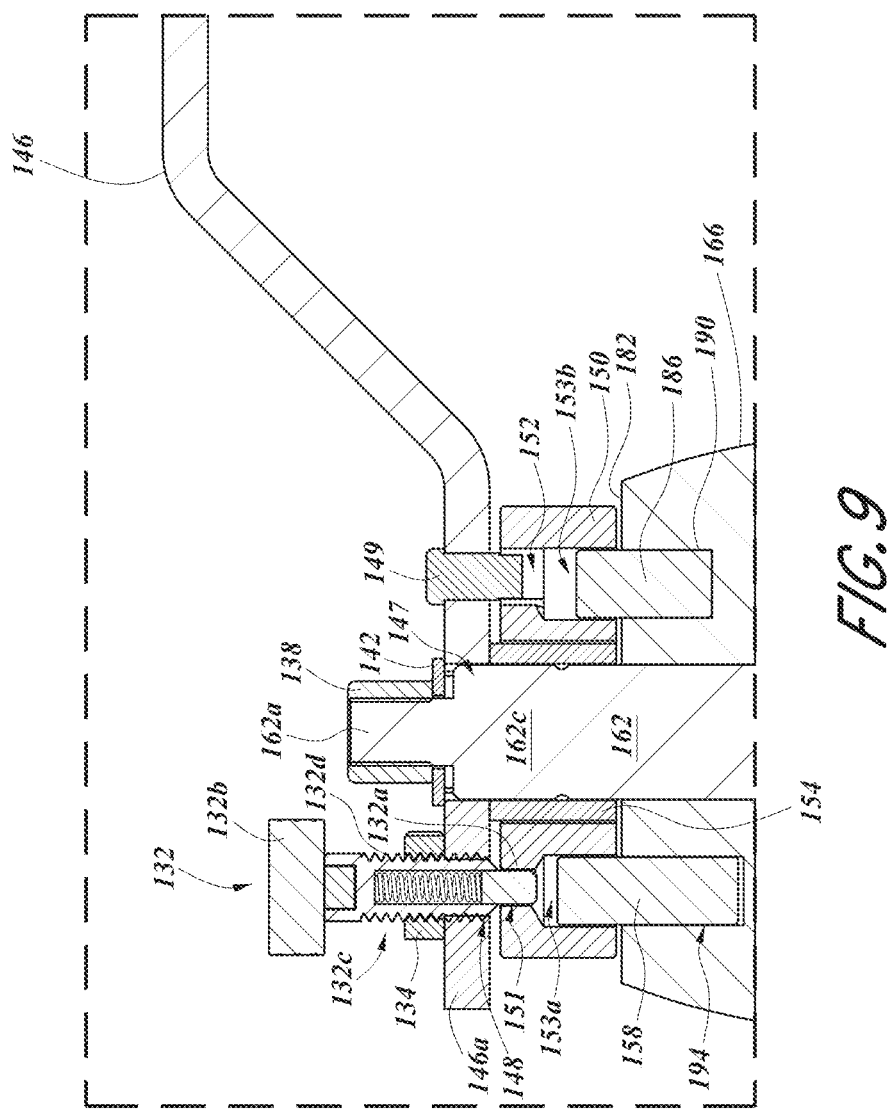
FIG. 9 is a detailed view taken at detail D in FIG. 8B.

The locking handle assembly 124 can include a detent plate 150. The detent plate 150 is shown in further detail in FIG. 5A through 5C. The detent plate 150 can include an inner periphery 150a. The inner periphery 150a can be circular or have a different cross sectional shape. The detent plate 150 can include an outer periphery 150b. The outer periphery 150b can be circular or have a different cross sectional shape. In one implementation, the outer periphery 150b has a diameter equivalent to a diameter of the flat region 182 of the upper housing 166.

The detent plate 150 can include a plurality of detent apertures 151. The detent apertures 151 can be spaced near the circumferential arc between the inner periphery 150a and the outer periphery 150b. In one implementation the plurality of detent apertures can be spaced at 45 degree angles with each other. Desirably, the detent apertures are spaced at least 15 degrees from each other, at least 30 degrees from each other or at least 45 degrees from each other. The spacing of the plurality of detent apertures 151 can correspond to positions aligning the plurality of fluid pathways 163b of the rotor 163 with the fluid pathways 174a of the lower housing 174. The plurality of detent apertures 151 can extend partially or all the way through the detent plate 150. In one implementation, the plurality of detent apertures 151 are three detent apertures: a first detent aperture 151a, a second detent aperture 151b, and a third detent aperture 151c.

The detent plate 150 can include a guide slot 152. The guide slot 152 can be a circumferential arc Desirably, the guide slot extends at least 30 degrees, at least 45 degrees, at least 60 degrees or at least 90 degrees. The guide slot 152 can extend partially or all the way through the detent plate 150. The guide slot 152 can be located to receive the guide protuberance 149 of the handle 146. The guide slot 152 can provide a hard stop on either end 152a, 152b for the rotation of the handle 146. For example the guide protuberance 159 can contact either end 152a or 152b to prevent further rotation of the handle 146 when assembled with the detent plate 150. The first end 152a can be aligned on an opposite side of a detent plate 150 from the third detent aperture 151c. The second end 152b of the guide slot 152 can be aligned on an opposite side of the detent plate 150 from the first detent aperture 151a.

The detent plate 150 can include a first alignment aperture 153a and/or a second alignment aperture 153b. The alignment apertures 153a, 153b can be positioned to align with corresponding alignment apertures 194, 190 of the upper housing 166. One or more alignment pins can fit between the corresponding alignment apertures to fix rotation of the detent plate 150 with respect to the flat portion 182 of the upper housing 166. For example, an alignment pin 158 can be received within the alignment opening 194 and the first alignment opening 153a when assembled together. A second alignment pin 186 can be aligned between the alignment opening 190 and the alignment opening 153b. Additional alignment pins and/or apertures can be used to fix the detent plate with the upper housing 166 against rotation. In one implementation, the second alignment aperture 153b can be aligned with the guide slot 152. In another implementation, the first alignment aperture 153a can be aligned with one of the plurality of alignment apertures (e.g. the second alignment aperture 151b).

FIGS. 6A and 6B show the spring pin 132. The spring pin 132 can include an end 132a. The spring 132 can include a head 132b. The spring pin 132 can include a shaft 132c. The head 132b can be attached with the shaft 132c. In one implementation the head 132b is formed integrally with the shaft 132c. In another implementation the head 132b can be attached (e.g. welded or through a press fit) with the shaft 132c. The shaft 132c can include a threaded region 132d. The end 132a can include a pin member 133a. The pin member 133a can be mounted within a slot 132e within the shaft 132c. A spring 133b can be located within the slot 132e. The spring 133b can bias the pin member 133a to an extended position. In other implementations the spring pin 132 can be a pin that is not a spring pin. For example, the spring pin 132 can be a conventional pin (e.g., solid pin) that does not have a threaded region, head and/or spring/pin member.

The locking handle assembly 124 can include a rotation insert 154. The rotation insert 154 can include an outer periphery 154a and an inner periphery 154b. The outer periphery 154a can be sized to be received within the inner periphery 150a of the detent plate 150. The rotation insert 154 can include that inner periphery 154b. The inner periphery 154b can be sized to be received over the first end 162a of the stem 162. The inner periphery 154b can be shaped to correspond to the flange portion 162c of the stem 162. The rotation insert 154 can have a height greater than a thickness of the detent plate 150. In another implementation, the rotation insert 154 can have a height that corresponds to a thickness of the detent plate 150.

The locking handle assembly 124 can include a washer 142 and/or a nut 138. The nut can attach with the first end 162a of the stem 162. The nut 138 can attach the handle 146 securely with the stem 162. The washer 142 can be optionally included on the first end 162a to reduce friction in the assembly of the locking handle assembly 124.

FIGS. 7A through 9 illustrate the assembly of the rotary valve 57 including the locking handle assembly 124 assembled with the valve assembly 128. The detent plate 150 can be assembled on the flat portion 182 of the upper housing 166. The first alignment aperture 153a can be aligned with the first alignment aperture 194a of the upper housing 166. The alignment pin 158 can be disposed within the alignment apertures 153a, 194. The second alignment aperture 153b can be aligned with the second alignment aperture 190. An alignment pin 186 can be disposed between the alignment apertures 153b and the alignment aperture 190. Accordingly the detent plate 150 can be non-rotatably assembled with the upper housing 166.

The inner periphery 150a of the detent plate 150 can be assembled over the flange portion 162c of the stem 162. The inner periphery 150a of the detent plate 150 can be assembled over the protruding portion of the stem 162. The rotation insert 154 can be assembled within the inner periphery 150a of the detent plate 150. The inner periphery 154b of the rotation insert 154 can be assembled around the flange portion 162c of the stem 162. The rotation insert 154 can space the handle 146 away from the detent plate 150. This can provide the advantage of reducing friction and/or damage when the handle 146 is rotated relative to the detent plate 150. Furthermore the rotation insert 154 can stabilize the protruding portion of the stem 162 during rotation. This can help in maintaining internal seals of the valve assembly 128.

The handle 146 can be assembled with the stem 162. The engagement slot 147 can be assembled over the flange portion 162c. The washer 142 can be assembled on the first end 162a of the stem 162 over the engagement slot 147. The washer 142 can span one or more sides of the engagement slot 147. The nut 138 can be assembled (e.g. threading the engaged) on the first end 162a to attach the handle 146 with the stem 162. The guide protuberance 149 can be aligned inside of the guide slot 152.

The pin 132 can be assembled on the inner end 146a of the handle 146. The spring pin 132 can be assembled within the nut 134 attached on the inner end 146a. The spring pin 132 can be threadingly engaged with the aperture 148 and/or the nut 134. The end 132a of the spring pin 132 can be aligned with one of the apertures of the plurality of detent apertures 151. The inner end 132a can be sized to just fit within the aperture 151.

Engagement of the spring pin 132 with the detent aperture 151 can lock the orientation of the handle 146 relative to the detent plate 150. This can prevent inadvertent or unauthorized rotation of the handle 146 and therefore manipulation of the rotor valve 57. This is an improvement over the existing ball spring mechanisms used to position the rotary valve, which can be unreliable. The ball spring mechanisms can fail to securely lock the position of the handle in a conventional rotary valve assembly, so that a sufficient force can misalign the rotary valve from the desired positioning. The spring pin 132 can securely lock the position of the rotary valve 57.

Rotation of the spring pin 132 in a first direction (e.g. clockwise) can further engage the end 132a within the detent aperture 151. Reverse rotation of the spring pine 132 in an opposite direction can withdraw the end 132a from the detent aperture 151. Accordingly, the position of the locking handle assembly 124 and the position of the valve assembly 128 can be manipulated by movement of the spring pin 132. This can facilitate locking/unlocking the position of the locking handle assembly 124 relative to the valve assembly 128 to control the flow of a pressurized fluid therethrough.

As shown in FIGS. 10A-10C, there could be three detent apertures of the plurality of detent apertures 151. Accordingly there can be three positions for the handle 146, the stem 162, and the rotor 163. The three positions can correspond to different flow paths of the valve assembly 128. The handle 146 can be locked into each of the three different positions by engagement of the spring pin 132 within one of the detent apertures 151. The guide slot 152 can align the handle 146 and the spring pin 132 with two outer positions of the plurality of detent apertures 151. The three positions of the handle 146 and the valve assembly 128 can direct flow along two different flow pathways and a closed pathway. Alternatively, the closed pathway can be an open center pathway. A first position can correspond to a first pathway leading the pressurized hydraulic fluid from the accumulators 56 to an opening actuator of the BOP. The pressurized hydraulic fluid delivered to the opening actuator can open the BOP. The second position can correspond to a second pathway leading deliver the flow of pressurized fluid from the accumulators 56 to a closing actuator of the BOP. A third position can close both the first and second pathways through the valve assembly 128.

According to another aspect, the locking handle assembly 124 can be a kit including any of the components listed above. It can also be expensive to entirely replace a rotary valve assembly (e.g., using a ball-spring mechanism). Accordingly, the kit can replace a minimal amount of components of the rotary valve. In addition to minimizing the cost of the unit, using parts from the existing rotary valve assembly can save on installation time and expense.

Figure 11:
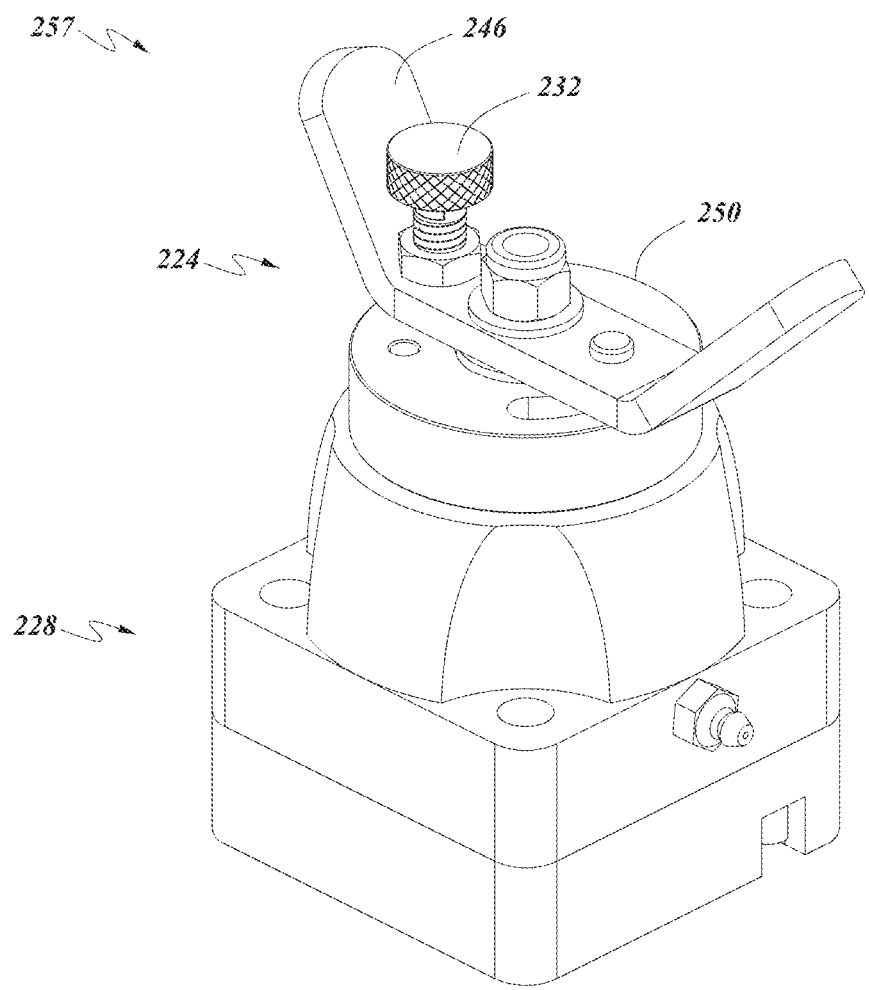
FIG. 11 shows another embodiment of a rotary valve assembly having another embodiment of a locking handle assembly.
Figure 12:
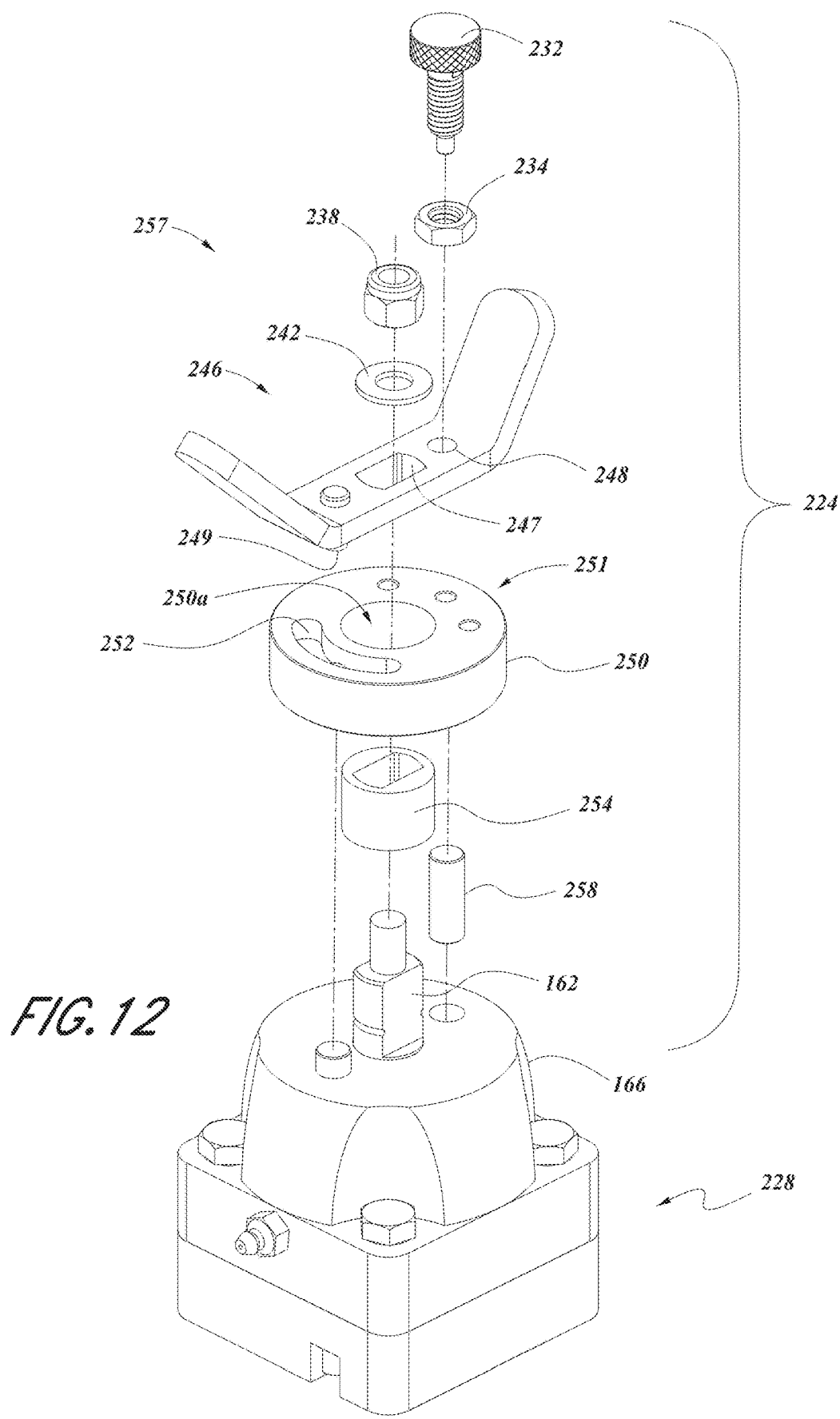
FIG. 12 is an exploded view of the rotary valve assembly of FIG. 11.

FIGS. 11 and 12 illustrate another embodiment of a rotary valve assembly 257. The rotary valve assembly 257 can include a locking handle assembly 224 and a valve assembly 228. The valve assembly 228 can comprise components similar or identical to the components of the valve assembly 128. Accordingly, the components of the valve assembly 128 are described above. The locking handle assembly 224 can include components similar or identical to the locking handle assembly 124 components. The locking handle assembly 224 can include any or all of an alignment pin 258, a retention insert 254, a detent plate 250 having an inner periphery 250a, a guide slot 252, a plurality of detent apertures 251, a handle 246, an alignment pin 249, an engagement slot 247, a pin aperture 248, a pin nut 234, a spring pin 232, a washer 242, and/or a nut 238. The locking handle assembly 224 could be assembled with the valve assembly 128 similar, as shown and described in relation to the control valve 57. The control valve 257 can have the same operation and/or assembly as the control valve 57.

Certain Terminology

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

SUMMARY

Several illustrative examples of valves have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can be included in any example.

In summary, various examples of valve components and related methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above, but should be determined only by a fair reading of the claims.

What is claimed is:

1. A control system for a blow out preventer (BOP), comprising:
   a hydraulic pump and a motor for powering the hydraulic pump;
   a plurality of pressure accumulator tanks hydraulically coupled with a common manifold for providing a flow of pressurized hydraulic fluid to an opening actuator and a closing actuator of a BOP on an oil or gas well drill string;
   a plurality of conduits hydraulically coupling the hydraulic pump with the plurality of pressure accumulators;
   at least one pressure regulator;
   a rotary valve assembly for selectively delivering the flow of pressurized hydraulic fluid to the BOP, the rotary valve assembly having an internal rotor defining a plurality of pathways and a stem engaged with the internal rotor, the stem having a flanged portion protruding from a housing of the rotary valve assembly; and
   a handle assembly comprising:
     a detent plate having an inner periphery disposed over the stem and non-rotatably assembled with an outer surface of the housing of the rotary valve assembly, the detent plate including a plurality of detent apertures and a guide slot;
     a handle having in an inner end and an outer end, the inner end including a spring pin, a guide protuberance, and an engagement slot between the spring pin and the guide protuberance, the engagement slot coupled with the flanged portion of the stem, an end of the spring pin extending at least partially through the inner end towards the plurality of detent apertures, and the guide protuberance disposed within the guide slot;
   wherein in a first position of the rotary valve assembly, the handle is rotated to align the spring pin with a first detent aperture of the plurality of detent apertures and the internal rotor is aligned along a first flow path to deliver the flow of pressurized hydraulic fluid to the opening actuator of the BOP, and the end of the spring pin is disposed within the first detent aperture to lock the rotary valve assembly in the first position;
   wherein in a second position of the rotary valve assembly, the handle is rotated to align the spring pin with a second detent aperture of the plurality of detent apertures and the internal rotor is aligned along a second flow path to deliver the flow of pressurized hydraulic fluid to the closing actuator of the BOP, and the end of the spring pin is disposed within the second detent aperture to lock the rotary valve assembly in the second position;
   wherein a rotation insert has an outer periphery matching the inner periphery of the detent plate and an inner slot configured to engage the flanged portion of the stem, the rotation insert disposed within the inner periphery of the detent plate and over the flanged portion of the stem.

2. The control system of claim 1, further comprising a third position of the rotary valve assembly;
   wherein in the third position, the handle is rotated to align the spring pin with a third detent aperture of the plurality of detent apertures and the internal rotor closes the flow of pressurized hydraulic fluid to the BOP, and the end of the spring pin is disposed within the third detent aperture to lock the rotary valve assembly in the third position.

3. The control system of claim 1, wherein the spring pin is threadingly engaged with the inner end of the handle such that rotation of the spring pin in a first direction engages the end of the spring pin with any of the plurality of detent apertures and rotation of the spring pin in a second direction disengages the end of the spring pin from any of the plurality of detent apertures.

4. The control system of claim 1, further comprising a washer and a nut attaching the handle with the stem.

5. The control system of claim 1, further comprising at least one alignment pin aligning the detent plate with the housing.

6. The control system of claim 1, wherein the guide slot is circumferentially curved.

7. A control system for a blow out preventer (BOP), comprising:
   a rotary valve assembly for selectively delivering a flow of pressurized hydraulic fluid to a BOP, the rotary valve assembly having an internal rotor defining a plurality of pathways and a stem engaged with the internal rotor, the stem having a flanged portion protruding from a housing of the rotary valve assembly; and
   a handle assembly comprising:
     a detent plate non-rotatably assembled with an outer surface of the housing of the rotary valve assembly, the detent plate including a plurality of detent apertures;
     a handle having in an inner end and an outer end, the inner end including a pin and an engagement slot, the engagement slot coupled with the flanged portion of the stem, an end of the pin extending at least partially through the inner end towards the plurality of detent apertures;
   wherein in a first position of the rotary valve assembly, the handle is rotated to align the pin with a first detent aperture of the plurality of detent apertures and the internal rotor is aligned along a first flow path to deliver the flow of pressurized hydraulic fluid to an opening actuator of the BOP, and the end of the pin is disposed within the first detent aperture to lock the rotary valve assembly in the first position;

wherein in a second position of the rotary valve assembly, the handle is rotated to align the pin with a second detent aperture of the plurality of detent apertures and the internal rotor is aligned along a second flow path to deliver the flow of pressurized hydraulic fluid to a closing actuator of the BOP, and the end of the pin is disposed within the second detent aperture to lock the rotary valve assembly in the second position;

wherein the pin is threadingly engaged with the inner end of the handle such that rotation of the pin in a first direction engages the end of the pin with any of the plurality of detent apertures and rotation of the pin in a second direction disengages the end of the pin from any of the plurality of detent apertures.

8. The control system of claim 7, further comprising a third position of the rotary valve assembly;

wherein in the third position, the handle is rotated to align the pin with a third detent aperture of the plurality of detent apertures and the internal rotor closes the flow of pressurized hydraulic fluid to the BOP, and the end of the pin is disposed within the third detent aperture to lock the rotary valve assembly in the third position.

9. The control system of claim 7, wherein the pin is a spring pin.

10. The control system of claim 7, further comprising a washer and a nut attaching the handle with the stem.

11. The control system of claim 7, further comprising at least one alignment pin aligning the detent plate with the housing.

12. The control system of claim 7, wherein a guide slot of the detent plate is circumferentially curved.

13. The control system of claim 7, further comprising a guide protuberance on the handle and a guide slot on the detent plate.

14. A control system for a blow out preventer (BOP), comprising:
 a rotary valve assembly for selectively delivering a flow of pressurized hydraulic fluid to a BOP, the rotary valve assembly having an internal rotor defining a plurality of pathways and a stem engaged with the internal rotor, the stem having a flanged portion protruding from a housing of the rotary valve assembly; and
 a handle assembly comprising:
  a detent plate non-rotatably assembled with an outer surface of the housing of the rotary valve assembly, the detent plate including a plurality of detent apertures;
  a handle having in an inner end and an outer end, the inner end including a pin and an engagement slot, the engagement slot coupled with the flanged portion of the stem, an end of the pin extending at least partially through the inner end towards the plurality of detent apertures;
 wherein in a first position of the rotary valve assembly, the handle is rotated to align the pin with a first detent aperture of the plurality of detent apertures and the internal rotor is aligned along a first flow path to deliver the flow of pressurized hydraulic fluid to an opening actuator of the BOP, and the end of the pin is disposed within the first detent aperture to lock the rotary valve assembly in the first position;
 wherein in a second position of the rotary valve assembly, the handle is rotated to align the pin with a second detent aperture of the plurality of detent apertures and the internal rotor is aligned along a second flow path to deliver the flow of pressurized hydraulic fluid to a closing actuator of the BOP, and the end of the pin is disposed within the second detent aperture to lock the rotary valve assembly in the second position;
 wherein a rotation insert has an outer periphery matching an inner periphery of the detent plate and an inner slot configured to engage the flanged portion of the stem, the rotation insert disposed within the inner periphery of the detent plate and over the flanged portion of the stem.

15. A locking handle assembly kit for converting a rotary valve assembly in a control system for a blow out preventer (BOP), comprising:
 a detent plate configured to be attached with a flat surface on a housing of the rotary valve assembly, the detent plate comprising:
  an inner periphery configured to be disposed over a stem of the rotary valve assembly;
  an upper surface having a plurality of detent apertures and a guide slot; and
  a lower surface having a first position aperture and a second position aperture;
 a first position pin configured to be assembled within a first aperture on the flat surface of the housing and within the first position aperture;
 a rotation insert configured to be disposed within the inner periphery and over a flange portion of the stem;
 a handle having in an inner end and an outer end, the inner end including a guide protuberance and an engagement slot, the engagement slot configured to be coupled with the flange portion of the stem, and the guide protuberance configured to be disposed within the guide slot;
 a spring pin configured to be assembled with the inner end of the handle with an end of the spring pin extending from the inner end towards the plurality of detent apertures;
 wherein in a first position of the rotary valve assembly, the handle is rotated to align the spring pin with a first detent aperture of the plurality of detent apertures and an internal rotor is aligned along a first flow path to deliver a flow of pressurized hydraulic fluid to an opening actuator of the BOP, and the end of the spring pin is disposed within the first detent aperture to lock the rotary valve assembly in the first position;
 wherein in a second position of the rotary valve assembly, the handle is rotated to align the spring pin with a second detent aperture of the plurality of detent apertures and the internal rotor is aligned along a second flow path to deliver the flow of pressurized hydraulic fluid to a closing actuator of the BOP, and the end of the spring pin is disposed within the second detent aperture to lock the rotary valve assembly in the second position.

16. The locking handle assembly kit of claim 15, further comprising a third position of the rotary valve assembly;
 wherein in the third position, the handle is rotated to align the spring pin with a third detent aperture of the plurality of detent apertures and the internal rotor closes the flow of pressurized hydraulic fluid to the BOP, and the end of the spring pin is disposed within the third detent aperture to lock the rotary valve assembly in the third position.

17. The locking handle assembly kit of claim 15, wherein the spring pin is threadingly engaged with the inner end of the handle such that rotation of the spring pin in a first direction engages the end of the spring pin with any of the plurality of detent apertures and rotation of the spring pin in a second direction disengages the end of the spring pin from any of the plurality of detent apertures.

18. The locking handle assembly kit of claim 15, wherein the guide slot is circumferentially curved.

* * * * *